(12) United States Patent
Rao et al.

(10) Patent No.: US 8,859,713 B2
(45) Date of Patent: Oct. 14, 2014

(54) PROCESS FOR MAKING POLYETHYLENE TEREPHTHALATE

(75) Inventors: Mummaneni Venkateswara Rao, Riyadh (SA); Munif Al-Munif, Riyadhi (SA); Zahir Bashir, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/256,437

(22) PCT Filed: Mar. 10, 2010

(86) PCT No.: PCT/EP2010/001480
§ 371 (c)(1),
(2), (4) Date: Nov. 28, 2011

(87) PCT Pub. No.: WO2010/102795
PCT Pub. Date: Sep. 16, 2010

(65) Prior Publication Data
US 2012/0071625 A1   Mar. 22, 2012

(30) Foreign Application Priority Data

Mar. 13, 2009  (EP) ................... 09075114

(51) Int. Cl.
*C08G 63/00* (2006.01)
*C08G 63/82* (2006.01)
C08G 63/02 (2006.01)
C08G 63/86 (2006.01)
C08G 63/83 (2006.01)

(52) U.S. Cl.
CPC ............. *C08G 63/82* (2013.01); *C08G 63/866* (2013.01); *C08G 63/83* (2013.01)
USPC ........... 528/281; 528/272; 528/274; 528/276; 528/285; 528/286

(58) Field of Classification Search
CPC ........ C08G 63/82; C08G 63/85; C08G 63/18; C08G 63/83; C08G 63/16; C08G 63/672; C08G 63/183; C08G 63/199; C08G 63/181; C08G 63/189; C08G 63/40; C08G 63/80; C08G 63/866; C08G 63/826; C08G 63/84
USPC .................. 528/272, 281, 285, 286
See application file for complete search history.

(56) References Cited

U.S. PATENT DOCUMENTS

| 4,064,112 A | 12/1977 | Rothe et al. |
| 4,146,729 A | 3/1979 | Goodley et al. |
| 4,161,578 A | 7/1979 | Herron |
| 5,008,230 A | 4/1991 | Nichols |
| 5,162,488 A | 11/1992 | Mason |
| 5,166,311 A | 11/1992 | Nichols |
| 5,372,864 A | 12/1994 | Weaver et al. |
| 5,384,377 A | 1/1995 | Weaver et al. |
| 5,608,032 A | 3/1997 | Yuo et al. |
| 5,623,047 A | 4/1997 | Yuo et al. |
| 5,898,059 A | 4/1999 | Trojan |

FOREIGN PATENT DOCUMENTS

| DE | 19537930 A1 | 4/1997 |
| EP | 0399742 A2 | 11/1990 |
| EP | 1574539 A1 | 9/2005 |
| WO | 9916537 A1 | 4/1999 |
| WO | 2004076513 A2 | 9/2004 |

OTHER PUBLICATIONS

German Patent No. 19537930 (A1); Publication Date: Apr. 17, 1997; Abstract Only; 1 Page.
Written Opinion of the International Searching Authority; International Application No. PCT/EP2010/001480; International Filing Date: Mar. 10, 2010; Date of Mailing: Jun. 23, 2010; 3 Pages.
International Search Report; International Application No. PCT/EP2010/001480; International Filing Date: Mar. 10, 2010; Date of Mailing: Jun. 23, 2010; 3 Pages.

*Primary Examiner* — Ling Choi
*Assistant Examiner* — Gennadiy Mesh
(74) *Attorney, Agent, or Firm* — Cantor Colburn LLP

(57) ABSTRACT

The invention relates to a process for making polyethylene terephthalate (PET) from ethylene glycol (EG), purified terephthalic acid (PTA) and optionally up to 30 mol % comonomer, using a catalyst system essentially consisting of antimony—(Sb), zinc—(Zn) and phosphorous—(P) compounds, comprising the steps of a) esterifying EG and PTA to form diethyleneglycol terephthalate and oligomers (DGT), and b) melt-phase polycondensing DGT to form polyester and EG1 wherein the Sb- and P-compounds are added in step a) and the Zn-compound is added after step a). With this process PET can be obtained that shows favorable color and optical clarity, also if recycling of EG is applied in the process, and a relatively low rate of acetaldehyde regeneration during melt-processing.

18 Claims, No Drawings

PROCESS FOR MAKING POLYETHYLENE TEREPHTHALATE

CROSS REFERENCE TO RELATED APPLICATIONS

This application is a 371 of International Application No. PCT/EP2010/001480, filed Mar. 10, 2010, which claims priority to European Application No. 09075114.0, filed Mar. 13, 2009, both of which are hereby incorporated by reference in its entirety.

TECHNICAL FIELD

The invention relates to a process for making polyethylene terephthalate (PET) from ethylene glycol (EG), purified terephthalic acid (PTA) and optionally up to 30 mol % comonomer, using a catalyst system essentially consisting of antimony—(Sb), zinc—(Zn) and phosphorous—(P) compounds, comprising the steps of a) esterifying EG and PTA to form diethyleneglycol terephthalate and oligomers (DGT), and b) melt-phase polycondensing DGT to form polyester and EG.

BACKGROUND

Such a process is for example known from patent application EP1574539A1. This document describes a process wherein PTA and EG are reacted in the presence of a catalyst system consisting of 15-150 ppm of Sb-compound and 40-160 ppm of Zn-compound as active catalyst components and 10-30 ppm of phosphoric acid as stabilizing component. In the reported experiments catalyst components were added together with PTA, EG, and optionally other components at the beginning of esterification step a), while the phosphoric acid was added at the end of esterification. Compared with a standard Sb-catalyst, this catalyst system is indicated not only to increase productivity in both melt-phase polycondensation and in a subsequent solid-phase polycondensation (SSP) step, but also to enhance optical properties of the PET; i.e. improved clarity and reduced greyish colour generally ascribed to Sb-catalyst residues.

Polyesters like PET are well-known in the art, and are widely applied in applications like textile and industrial fibres, films and sheets, and containers, especially bottles. Initial PET production employed dimethyl terephthalate (DMT) and ethylene glycol (also called monoethylene) glycol (EG) as precursors, but most production plants currently use purified terephthalic acid (PTA) and EG as raw materials, because of process economic reasons. In this case, first an oligomer or low molecular mass prepolymer is formed by esterification of PTA with a molar excess of EG to form diethyleneglycol terephthalate (also called bis hydroxyethyl terephthalate) and oligomers thereof (DGT), with water being the main by-product distilled off (step a). This step is generally self-catalysed, but may be accelerated by adding catalyst. DGT is further subjected to polycondensation by transesterification to form higher molecular mass polyester (step b). In this step, DGT is heated to about 280° C. under high vacuum to carry out the melt-phase polycondensation reaction with removal of EG liberated in the polycondensation reaction. Because the transesterification is a slow reaction, the polycondensation step is generally catalysed. This catalyst can be added in step b), but it can also already be included in step a). The melt is discharged and made into pellets after it reaches a desired molecular mass, reflected by intrinsic viscosity (IV) values. Commercial-scale PET production is generally based on a continuous PTA system employing several reactors in series, as described for example by S. M. Aharoni in "Handbook of Thermoplastic Polyesters", vol. 1, chapter 2, Editor S. Fakirov, Wiley-VCH, 2002; and by V. B. Gupta and Z. Bashir in "Handbook of Thermoplastic Polyesters", vol. 1, chapter 7, Editor S. Fakirov, Wiley-VCH, 2002. Typically, such a system uses a vessel in which EG, PTA, catalyst and additives are mixed to form a paste; one or more esterification reactors; one or more pre-polycondensation reactors, followed by a high-vacuum, finisher reactor for the final stages of polycondensation. The polyester formed may be extruded into strands, quenched under water and cut to form pellets or chips. PET used in film and fibre applications typically has an IV in the range of 0.55 to 0.65 dL/g; PET films and fibres can also be produced directly by extruding the melt from the poycondensation reactor. For PET bottle grade resin, polymers with IV in the range of 0.75 to 0.85 dL/g, and having low residual acetaldehyde are generally required. In this case, a split process is used to attain this IV value while attaining a low amount of acetaldehyde. The general practice is to make polymer chips with an intermediate IV of about 0.63 dL/g by melt-polycondensation, and then increase the IV by subsequent solid-state polycondensation (SSP). This split procedure allows production of a high IV resin with minimal quantities of acetaldehyde, which is a degradation by-product that affects the taste of beverages packed in PET bottles. Diethylene glycol (DEG) is a diol generated from ethylene glycol via a side-reaction and is also incorporated in the PET chain. Presence of DEG as comonomer reduces the glass transition and melting temperature of the PET, but too high levels are undesirable. The melt-phase and SSP technology is described for example in Encyclopaedia of Polymer Science and Engineering, $2^{nd}$ ed, volume 12, John Wiley and Sons, New York (1988), and in "Handbook of Thermoplastic Polyesters", vol. 1, chapter 7, Editor S. Fakirov, Wiley-VCH, 2002.

The catalysts currently employed in more than 90% of industrial PET production are based on antimony (Sb), mostly on antimony triacetate or antimony trioxide. Typically, about 200-300 ppm Sb (based on PET) is used to provide sufficiently fast reaction. A disadvantage of using antimony-based catalyst compounds is the greyish colour of PET that is reported to result from precipitation of antimony metal particles. Moreover, antimony is rather expensive and shows some environmental concerns. Various publications addressed catalysts systems for PET that combine Sb with a second or third metal compound to result in some synergistic effect. For example, U.S. Pat. No. 5,008,230 and U.S. Pat. No. 5,166,311 describe a tri-component catalyst based on antimony, 5-60 ppm of cobalt and/or zinc, and 10-150 ppm of zinc, magnesium, manganese or calcium. As zinc can be present as the second and third component, a bi-metallic composition with 150-650 ppm of antimony and 5-210 ppm of zinc is included. The catalyst components can be added at any time before or during polycondendation, and would allow reducing melt-polycondensation times by at least one-third, compared to the conventional antimony catalyst. Other patent publications covering Sb—Zn catalyst compositions include U.S. Pat. No. 5,162,488, and EP0399742. U.S. Pat. No. 5,623,047 claims that the optical appearance of the PET made from the PTA process can be improved by introducing alkali metal acetate as third component besides antimony and at least one of cobalt, magnesium, zinc, manganese and lead. U.S. Pat. No. 5,608,032 discloses a catalyst system that contains 10-1000 ppm Sb, 10-500 ppm of at least one of Co, Mg, Zn, Mn, Ca and Pb, and 10-500 ppm of a P-compound; all components being added to the esterification step.

In a PET production process as described above, EG formed is removed from the reaction mixture during the polycondensation step, such that the equilibrium reaction will proceed. The EG removed, also referred to as spent glycol, is preferably re-used or recycled in the process for efficiency and cost control reasons. In DE19537930 a continuous process for making polyesters like PET is described, wherein the EG distilled off is used—after removal of water and other low boiling point components—in the initial paste making step in combination with fresh or virgin EG and phosphoric acid (or a glycol ester thereof). In this process, the metal catalyst— based on Sb, Ti, Ge, Sn, Zn, Mn or mixtures thereof—is only to be added after 65-80% of the total esterification time has elapsed to control optical properties of the PET. U.S. Pat. No. 4,146,729 relates to a continuous direct esterification process for PET, wherein removed EG is recovered for re-use in the slurry making step by applying a rectification column. In WO9916537 the use of cross-flow membrane filtration is proposed as alternative to distillation steps in order to purify spent glycol and make it suited for recycling to paste making. These documents are generally silent on effects of EG re-use on the PET polymerisation process or polymer properties. In WO2004076513 it is taught that improved colour and clarity of PET results if spent EG is purified by hydrogenating impurities in the glycol before re-using it in the process.

A disadvantage of the known process for making PET from EG, PTA and optionally up to 30 mol % comonomer, using a catalyst system essentially consisting of Sb-, Zn- and P-compounds, comprising the steps of a) esterifying EG and PTA to form diethyleneglycol terephthalate and oligomers (DGT), and b) melt-phase polycondensing DGT to form polyester and EG as described in EP1574539, is that in case spent EG is recycled to the esterification step a)—instead of using only virgin EG—the PET that is obtained shows pronounced haze in moulded articles like bottles.

SUMMARY

It is therefore an objective of the present invention to provide a process for making PET from EG, PTA and optionally comonomer, which does not result in said haze problems.

This object is achieved according to the invention with such a process wherein the Sb- and P-compounds are added in step a) and the Zn-compound is added after step a).

DETAILED DESCRIPTION

With the process according to the invention PET can be obtained that shows a neutral colour and high optical clarity, also if recycling of EG is applied in the process. The process can be operated on industrial scale with high productivity. A further advantage of the process according to the invention is that the PET obtained shows good thermal stability; it has a relatively low content of carboxylic acid end-groups, and shows a relatively low rate of acetaldehyde (AA) regeneration during melt-processing. The PET obtained with the process according to the invention is thus eminently suited for making packaging articles, especially for packing food products; like bottles having excellent mechanical, optical and organo-leptic properties.

In the process according to the invention for making PET from EG and PTA optionally up to 30 mol % of a comonomer can be used. PET is considered to be a thermoplastic polyester with a substantially linear polymer chain, optionally having some degree of branching, which can be melt-processed into shaped articles. The presence of comonomer will affect the crystallisation behaviour and the melting point of the polymer; as is known to a person skilled in the art. A high content of comonomer may even result in a copolyester that is substantially amorphous. Typically, an amount of comonomer is chosen that results in a crystallisable polyester that can be melt-processed at lower temperature settings than homopolymer PET into products with high optical clarity, but which still results in a formed—e.g. stretch-blow moulded—article showing good mechanical properties (due to orientation-induced crystallisation). For this reason, the amount of comonomer used in the process according to the invention is preferably at least 0.5, 1.0, 1.5 or 2.0 mol %, but at most 10, 8, 6 or 4 mol %.

In the process according to the invention for making PET from EG and PTA at least one comonomer may be used, and suitable comonomers can be selected from di- or polycarboxylic acids or their ester-forming derivatives, from di- or poly-hydroxy compounds or their ester-forming derivatives, from hydroxycarboxylic acids or their ester-forming derivatives, and from combinations thereof. Preferably, a di-functional compound is used as comonomer.

Suitable carboxylic acids include dicarboxylic acids of the formula HOOC—R—COOH, wherein R is a—linear or branched—alkylen group, an arylene group, an alkenylen group, or a combination thereof. Preferably, R has about 2 to 30, preferably about 4 to 15 carbon atoms. Suitable examples of carboxylic acid compounds include saturated aliphatic dicarboxylic acids such as oxalic acid, malonic acid, succinic acid, gluratic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid; unsaturated aliphatic dicarboxylic acids such as fumaric acid, maleic acid, and itaconic acid; and aromatic dicarboxylic acid such as orthophthalic acid, isophthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4,-biphenyldicarboxylic acid, 4,4'-biphenylsulfonedicarboxylic acid, 4,4'-biphenyl ether dicarboxylic acid, 1,2-bis (phenoxy)ethane-p,p'-dicarboxylic acid, pamoic acid, and anthracenedicarboxylic acid. More preferably, the comonomer is at least one compound selected from the group consisting of isophthalic acid, naphthalenic diacid, succinic acid, adipic acid, phthalic acid, glutaric acid, oxalic acid, and maleic acid. Most preferably, the carboxylic acid compound is isophthalic acid.

Suitable hydroxy-functional compounds include alkylene glycols of the formula HO—R'—OH, a polyalkylene glycol having the formula HO—[R"—O—]$_n$—H, or combinations thereof, wherein R' is an alkylene group, linear or branched, having 3 to about 10, preferably 3 to 4 carbon atoms, and wherein R", being the same or different, is an alkylene group having 1 to about 10, preferably 1 to 5 carbon atoms. Suitable examples of the alcohol-based compound include aliphatic glycols such as 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl) methane, 1,2-bis(p-hydroxyphenyl)ethane, bisphenol A, bisphenol C, 2,5-naphthalenediol, and glycols obtained by adding ethylene oxide to these glycols. Preferably, the hydroxyl-functional comonomer is at least one compound selected from the group consisting of diethylene glycol, 1,3-propylene glycol, 1,4-butylene glycol, and 1,4-cyclohexanedimethanol. More preferably, diethylene glycol and/or 1,4-cyclohexanedimethanol is used in the process according to the invention.

Small amounts of polyhydric alcohols may also be used as comonomer. Suitable examples of polyhydric alcohols are trimethylolmethane, trimethylolethane, trimethylolpropane, pentaerythritol, glycerol, and hexanetriol. Hydroxycarboxylic acids may also be used in combination. Examples of suitable hydroxycarboxylic acids include lactic acid, citric acid, malic acid, tartaric acid, hydroxyacetic acid, 3-hydroxybutyric acid, p-hydroxybenzoic acid, p-(2-hydroxyethoxy) benzoic acid, 4-hydroxycyclohexanecarboxylic acid and their ester-forming derivatives. Also, cyclic esters in combination may be used in present invention. Examples of cyclic esters include ε-caprolactone, β-propiolactone, β-methyl-β-propiolactone δ-valerolactone, glycollide, and lactide.

In a preferred way of operating the process according to the invention, a PET is made that contains 0.5-6 mol % of at least one comonomer selected from the group consisting of isophthalic acid, diethylene glycol and 1,4-cyclohexanedimethanol.

The process according to the invention may be performed batch-wise or as a continuous process; as is known in the art.

The process according to the invention comprises a step a) of esterifying EG and PTA and optionally comonomer to form diethyleneglycol terephthalate and oligomers (DGT). This step can be performed in various ways and under conditions as known from the art. Typically, this step involves initially making a mixture of the EG, PTA, comonomer, catalyst components, and other additives such as colour correcting agents like cobalt compounds and other soluble colourants. EG is typically applied in a molar excess to PTA, for example EG/PTA ratio may be from 1.1 to 3, preferably 1.5-2. This excess EG is later removed again during polycondensation. The mixture is typically not a solution but a paste or slurry. In addition to preparing the mixture in a separate slurry tank, the esterification step may be performed in one or more esterification tanks or reactors, in which the mixture is heated to temperatures in the range 200-300° C., preferably 230-270° C., at a pressure of about 0.1-10 MPa. Nitrogen is preferably used to prevent oxidation. Water formed in the reaction is removed from the system. Esterification results in a mixture of diethyleneglycol terephthalate and various oligomers, together referred to as DGT.

In step b) of the process according to the invention the obtained DGT mixture is further reacted in one or more reactors operated at elevated temperatures, for example in the range 240-300° C., preferably at 270-290° C.; under reduced pressure or with an inert gas stream to facilitate removal of formed EG, water, alcohols, aldehydes or other reaction products. This melt-phase polycondensation or polymerisation step is typically operated at a pressure of 50-500 Pa, preferably at about 100 Pa to form a precursor polyester having an intrinsic viscosity of about 0.5 to about 0.7 dL/g, preferably 0.60 to 0.65 dL/g.

After the polycondensation step, the polyester formed may be directly extruded into fibres, filaments, films or strands by employing any method known in the art, such as melt-spinning. Such polyester fibres may be used as industrial or textile fibres for clothing, tire cords, ropes, civil engineering and construction applications, in the form of yarns, woven fabrics, knitted products, nets, and the like. PET sheets can be applied for photographic films or for thermo-formable packaging.

Alternatively, the process according to the invention further comprises subsequent steps of c) forming the polyester into pellets, d) crystallising the pellets, and e) solid-state polycondensing the polyester. Such a sequence of steps will result in a PET in pellet form that can be easily handled and further processed, and having an intrinsic viscosity of at least about 0.7 dL/g, preferably IV of about 0.7-1.5 dL/g, more preferably about 0.75-0.85 dL/g. Such higher IV, that is a higher molar mass, results in a polyester product with a better combination of properties, especially increased mechanical properties that can meet the stringent requirements for bottles.

Granulating or pelletizing the PET in step c) can be done applying any known method, and may result in pellets of varying size and shape. In step d), the generally amorphous pellets are first crystallized by heating slowly to a temperature between the crystallisation temperature and crystalline melting point of the polyester, in order to prevent agglomeration of pellets during the subsequent step e) of solid-state polycondensation (SSP). The SSP step may be conducted at a temperature between the glass transition temperature and the melting point of the polyester, preferably at a temperature in a range of about 180 to 220° C., under reduced pressure or by passing an inert gas stream, preferably a nitrogen stream, over a bed of pellets or granules. Various solid stating processes are known in the art; such processes are for instance described in U.S. Pat. No. 4,064,112 and U.S. Pat. No. 4,161,578. The polyester obtained by applying the solid-state polycondensation step is particularly suitable for producing hollow moulded articles, such as tubes, pipes, and containers; using for example an extrusion moulding or an injection moulding apparatus.

The process according to the invention has the specific advantage that PET can be obtained showing a neutral colour and high optical clarity, also if EG formed in polycondensation step b) is separated and again applied in the process. The EG formed is preferably distilled off from the reactor or reactors applied, and returned to step a), preferably to a paste making step that forms part of step a). The process may optionally include steps of further purifying the EG distilled-off as known in the art, but preferably the distilled EG is fed to step a) without additional purification or post-reaction steps. The invention thus specifically relates to a process as defined above, wherein EG removed from polycondensation step b) is recycled back to esterification step a).

The catalyst system used in the process according to the invention essentially consists of Sb-, Zn-, and P-compounds, which is understood within this application to mean that these are the dominant components that affect the rate of reactions occurring. The Sb and Zn components are the actual catalytic components enhancing the esterification and especially the polycondensation reactions. These components are, however, also known to affect other reactions like some degradation reactions. Amongst others for this reason a P-compound is contained in the catalyst sytem, which compound acts as thermal stabiliser to reduce degradation reactions that lead to polymer discolouration in particular. This is common practice also in other catalyst sytems used for polyester production. Typically, such P-compound is added in prior art after step a), that is, at the end of esterification. In addition to Sb-, Zn-, and Sb-compounds there may be also other metal components present in the process, which could act as a catalyst, but then at such low concentrations that their influence is hardly noticeable. Examples of such components include Co-compounds, which are added at low concentration (typically <15 ppm Co based on polyester) to correct the slightly yellow colour of the polyester rather than to increase reaction rate.

The catalyst system used in the process according to the invention contains a Sb-compound. Suitable antimony compounds include Sb(III) and Sb(V) compounds as recognized in the art as being a polycondensation catalyst, in particular those compounds that react with, more preferably those that are soluble in EG. Examples of suitable compounds include antimony triacetate, antimony trioxide, antimony tricarbonate, antimony glycolates and mixtures thereof. The Sb-compound is typically added in an amount resulting in 15-220 ppm Sb based on PET mass, preferably 50-200 ppm, more preferably 75-175 ppm, 100-160 ppm or 125-150 ppm.

The catalyst system used in the process according to the invention further contains a Zn-compound. Suitable zinc compounds include the compounds as recognized in the art as being a polycondensation catalyst, in particular those compounds that react with, more preferably those that are soluble in EG. Examples of suitable compounds include zinc diacetate, zinc oxide, zinc carbonate, zinc peroxide, zinc hydroxide, zinc halide, zinc sulphide, zinc glycolate, zinc metal and mixtures thereof. The Zn-compound is typically added in an amount resulting in 50-200 ppm Zn based on PET mass, preferably 75-175 ppm, more preferably 75-175 ppm, 100-150 or 120-140 ppm.

The total amount of metal components in the catalyst system applied in the process according to the invention is preferably 150-400 ppm, more preferably 200-300 ppm.

The catalyst system used in the process according to the invention further contains a P-compound. Suitable phosphorous compounds include the compounds as recognized in the art as being a stabilizing compound in polyester. Examples of suitable compounds include phosphoric acid, phosphorous acid, polyphosphoric acid, phosphate esters like triethyl phosphate or tributyl phosphate and mixtures thereof. Preferably, phosphoric acid is used, which results in good polycondensation reactivity and good thermal stability of PET, in addition to being a convenient and inexpensive additive that is also allowed for food-contact applications. The P-compound is typically added in an amount resulting in 10-100 ppm P based on PET mass, preferably 20-80 ppm, more preferably 30-70 ppm, or 40-60 ppm. The advantage of such concentration is to retain a high polycondensation rate also in solid state, but to lower rate of acetaldehyde formation in the PET, especially regeneration during processing in the melt.

In the process according to the invention, the components of the catalyst system, essentially consisting of Sb-, Zn- and P-compounds, are not added together, but in order to solve the stated haze problems the Sb- and P-compounds are added in step a) and the Zn-compound is added after step a). Preferably, the Sb- and P-compounds are added together with the raw materials PTA and EG and optionally other additives to the paste making step that forms part of step a), but may also be added later during the esterification. The Zn-compound should only be added at the end of the esterification step a), for example just before or during transferring the DGT mixture to a subsequent reaction vessel for performing the polycondensation step b), or at the beginning of the polycondensation step b). Preferably, the Zn-compound is added in the form of a solution in ethylene glycol.

In a preferred embodiment of the process according to the invention, the catalyst system essentially consists of 100-160 ppm Sb, 100-150 ppm Zn, and 30-70 ppm of P (elemental contents based on PET), more preferably of 125-150 ppm Sb, 120-140 ppm of Zn, and 40-60 ppm of P.

In a further preferred embodiment of the process according to the invention, the catalyst system essentially consists of 125-150 ppm Sb added as Sb-triacetate, 120-140 ppm of Zn added as Zn-diacetate, and 40-60 ppm of P added as phosphoric acid.

In the process according to the invention, also other common additives may be added if desired. Such additives can include colourants, preferably those soluble in PET, to either adjust or correct the natural colour of the PET to a more neutral tone, or to result in a desired colour, like light blue. Colour correcting agents include cobalt-compounds, and/or organic toners like blue or red toners, such as described in U.S. Pat. No. 5,372,864 or U.S. Pat. No. 5,384,377. Other suitable additives include heat-stabilizers, anti-oxidants, reheating aids, anti-blocking agents, lubricants, acetaldehyde scavenging agents, and the like. The amount of said additives may vary up to several mass percentages, but is generally kept as low as possible, for example at most 5, 4, 3 or 2 mass %.

The process according to the invention can be operated in known reactors, as known to a person skilled in the art and described in a.o. above cited references.

The invention also relates to PET obtained with the process according to the invention and having favourable properties, which PET can be used in forming a great variety of articles for many different applications, including fibres, tubes, profiles, sheets, and packaging articles like thermoformed trays, and stretch-blow moulded bottles from injection moulded performs.

The invention will now be further elucidated with the following experiments.

Test Methods

Intrinsic Viscosity

The intrinsic viscosity or IV is a measure of the molecular mass of the polymer and is measured by dilute solution viscosimetry. All IVs were measured in a 3:2 mixture of phenol-1,2 dichlorobenzene solution, at 25° C. Typically, about 8-10 chips were dissolved to make a solution with a concentration of about 0.5%. The IV was obtained from the measurement of relative viscosity $\eta_r$ for a single polymer concentration by using the Billmeyer equation shown below (see F. W. Billmeyer, *J. of Polymer Sci.* 1949 IV, 83), which equation is valid for the range c=0.5-0.65 g/dL.

$$IV=[\eta]=0.25(\eta_r-1+3 \ln \eta_r)/c.$$

Colour

The colour parameters were measured with a HunterLab ColorFlex Model No 45/0, serial No. CX 0969. Amorphous chips were used without grinding or crystallisation, in the transparent state. Generally, the changes measured could also be seen by eye. The colour of the transparent amorphous chips was categorized using the CIE tristimulus $L^*$, $a^*$ and $b^*$ values. The $L^*$ indicates the brightness of the samples, with a high value signifying high brightness. $L^*=100$ stands for perfectly white; $L^*=0$ is perfectly black. The $a^*$ value indicates the green-red contrast (− value indicates greenness; + value indicates redness); the $b^*$ value indicates blue-yellow contrast (− value indicates blue; + indicates yellow).

The measurements of the colour of the SSP chips were done without grinding. The $L^*$ values after SSP are higher because of whitening caused by spherulitic crystallisation of the polymer.

Haze

Haze on blown bottles was measured on panels of about 3 cm diameter and 0.238 mm thickness, cut from flat parts of a 1.5 L bottle made from a 32 g perform, using a Haze Gard Plus (BYK Gardner). Haze is the percentage of transmitted light that after passing through the sample is scattered by more than 2.5° (ASTM D-1003-97). Values are reported as % haze normalized to the sample thickness (%/mm, or % haze per mm of sample thickness).

In case of experiments performed on smaller scale, test plates were made by injection moulding (in a cold mould) and haze was visually evaluated.

DEG

To determine the DEG content, the PET was trans-esterified with methanol in an autoclave at 220° C. During this, the PET is depolymerised and the DEG is liberated as the diol. The liquid formed was analysed by Gas Chromatography (GC) to determine the DEG content of the polymer, after suitable calibration.

COOH End Groups

The PET was dissolved in a mixture of o-cresol and chloroform, under reflux conditions. After cooling to room temperature, the COOH end groups were determined using potentiometric titration with ethanolic KOH solution, under a nitrogen atmosphere. The results are expressed in mVal of COOH/kg of PET (milli equivalent of COOH per kg of PET).

Residual Acetaldehyde (AA) in SSP Chips

The AA was measured by Head Space Gas Chromotography (GC), after cryogenic grinding of the polymer chips into a powder. 1 g of the powder was placed in a GC vial. The standard headspace-method was used for residual AA in resins, and involved heating the vial at 150° C. for 90 minutes, before injection in the GC column. The GC was calibrated with aqueous solutions of acetaldehyde of known concentrations.

Acetaldehyde Regeneration on Melting of SSP Polymer

The AA regenerated when the chips are melted is a most important property for bottle grade chips, and reflects what would happen in a preform during injection moulding (e.g. in case not enough material is available for perform making) The AA generation test involved (1) cryogenically powdering the SSP polymer pellets; (2) drying the powder for 55 minutes at 170° C. in a vacuum; (3) melting the dried powder in a melt viscometer at 280° C. for 4 minutes; using a die insert without a hole, with a nitrogen blanket; (4) removing the die insert and pushing out the molten blob with a rod, into a beaker of cold water; (5) cutting and cryogenically grinding the frozen blob; (6) using 1 g of the ground extrudate powder in a gas chromatography (GC) vial and measuring AA by standard headspace GC (90 minutes at 150° C.).

Synthesis of Polyesters

Comparative Experiments A-C

In CE A, standard PET was made with antimony catalyst in a continuous polymerisation facility, comprising slurry making, esterification, melt-polycondensation, granulating, and solid-state polycondensation steps, from PTA, EG and 2 mass % IPA as raw materials, using Sb triacetate as catalyst (Sb content 256 ppm), phosphoric acid (15 ppm of P) as stabilizer, and Co acetate (15 ppm of Co) and a blue toner as colour correcting agents. All components were fed to the slurry tank, i.e. a paste making step preceding esterification, except for the P-stabilizer that was dosed after the esterification, but before starting polycondensation. EG distilled off from melt-polycondensation was condensed and recycled to the paste making step. From the obtained solid-stated PET, 32 g preforms were injection moulded on a 2-cavity Husky machine at 273-275° C. Subsequently, the preforms were stretch-blow-moulded into 1.5 liter bottles. Experimental data for CE A are-summarized in Table 1.

In CE B a PET mas made in the same way as CE A, except that no EG recycling was applied. The resulting PET polymer showed—within experimental error—the same properties as reported for CE A (results not shown in Table 1). Thus, with antimony catalyst no difference in polymer properties is observed if spent glycol is used.

A Sb—Zn—P catalyst/stabiliser was applied in CE C following the same procedure as for CE A; Zn acetate was also added to the slurry tank. This experiment can be considered a scale-up of the procedure described in EP1574539, with using recycled EG in a continuous polymerisation system being an important difference here. The production capacity was higher than for CE A and CE B, but results in Table 1 indicate that the PET thus obtained showed also significantly higher AA regeneration, and had high haze in blown bottles as compared to CE A. Uniform haze was also visible in the injection moulded preforms of CE C; it was observed that upon stretching the preform into bottles, the opacity in fact surprisingly increased.

Several additional control experiments applying this Sb—Zn—P catalyst+stabiliser were performed in a 25 L batch reactor, whereby EG distilled during one batch was used as (part of the) starting EG in a next batch. These batch experiments confirmed that use of a mixture of virgin and recycled EG—in stead of only virgin EG as in experiments reported in EP1574539—resulted in significant haze in moulded articles. Also higher AA generation was observed in all cases, as compared with batches made in a similar manner with antimony catalyst and phosphoric acid stabiliser.

Comparative Experiments D-H

A reaction vessel of 25 liter was filled with 6756 g of PTA, 160 g IPA, 3327 g EG, 5.0 g Sb-triacetate (254 ppm of Sb), 0.33 g of phosphoric acid (13 ppm of P), and 0.39 g of Co-acetate and 0.016 g Estofil Blue toner, and made into a paste. This batch yields 7992 g of PET. Note that unlike CE A and CE B, the phosphoric acid was added in the slurry. Esterification was conducted by heating to 255° C. under nitrogen atmosphere, and the water formed was collected. When the amount of water formed indicated the desired degree of esterification, the vessel was heated to 275° C. and pressure was reduced to about 100 Pa. Polycondensation was considered to start when torque of the mechanical stirrer was observed to increase, and was continued until the torque reached a value of 19 Nm (which would correspond to PET of IV of about 0.58 dL/g based on earlier experiments). Ethylene glycol liberated during polycondensation was condensed and collected. The polyester melt was then discharged (by applying nitrogen pressure on the reactor) as strands that were quenched in a water bath and chopped into transparent pellets.

A second PET batch was then produced in a similar way, wherein 400 g of the virgin EG was replaced with collected EG from the first batch; that is recycled EG was used. The amorphous PET chips now obtained were crystallized by heating at 170° C. for 1 hour, and then polycondensed in solid-state at 210° C. with a continuous nitrogen flow during 6 hours. The thus obtained white pellets were analyzed as indicated above; results are collected in Table 1 (CE D). Injection moulded samples of this standard antimony PET made with recycled glycol were clear; using recycled glycol and addition point of phosphoric acid appear to have no undesirable effect with antimony catalyst.

Following the above procedure, experiments E-H were performed applying a combination of Sb-triacetate and Zn-diacetate (also called Zn-acetate) as catalyst, and varying amounts of P-compound. All the experiments used recycled glycol as part of glycol feed, and Zn-compound was added with all the other compounds to make a paste. Results are shown in Table 1. Key points to note include higher AA regeneration and lack of clarity after injection moulding of plaques. Thus, introduction of zinc acetate with antimony compound reduces melt polycondensation time, but after SSP, the PETs containing zinc generally have higher AA regeneration tendency and show haze when recycled glycol is used.

Examples 1-2

Following the above procedure of CE F and H, experiments of Examples 1 & 2 were performed applying a combination of 2.75 g Sb-triacetate (140 ppm of Sb) and 3.44 g Zn-diacetate (128 ppm of Zn) as catalyst, but the zinc compound was dissolved in some EG and dosed to the reactor only at the end of the esterification (step b), Table 1).

bottles and to validate applicability on industrial scale. A 3-vessel system was applied, having a slurry preparation tank, an esterification reactor, and a melt-polycondensation reactor; followed by a cooling bath and strand granulator. Polymerisation was performed under similar conditions as indicated for experiments D-H and Example 2. Three consecutive batches were made without interruption, wherein EG collected from batch 1 was used in batch 2, likewise for batches 2 and 3. Batch 3 was further tested: first the pellets were crystallized and solid-stated (in a rotating drum reactor under vacuum, at 170/210° C., respectively), then preforms were moulded and brilliantly clear bottles were formed.

The data collected in Table 1 confirm the findings of the above experiments; optical properties (haze) and AA regeneration behaviour of the PET of Ex 3 are even better than for CE A (reflecting a commercially available PET grade, made with standard antimony catalyst).

TABLE 1

| | (unit) | A | C | D | E | F | Ex. 1 | G | H | Ex. 2 | I | Ex. 3 |
|---|---|---|---|---|---|---|---|---|---|---|---|---|
| melt phase polymerisation | | | | | | | | | | | | |
| PET batch size | (kg) | cont. | cont. | 8 | 8 | 8 | 8 | 8 | 8 | 8 | 50 | 50 |
| Sb-content | (ppm) | 256 | 140 | 254 | 220 | 140 | 140 | 140 | 140 | 140 | 254 | 140 |
| Zn-content | (ppm) | 0 | 128 | 0 | 20 | 128 | 128 | 128 | 128 | 128 | 0 | 128 |
| Zn addition in step | | | a) | | a) | a) | b) | a) | a) | b) | | b) |
| P-content | (ppm) | 15 | 15 | 13 | 13 | 13 | 13 | 35 | 45 | 45 | 13 | 45 |
| P addition in step | | b) | b) | a) | a) | a) | a) | a) | a) | a) | a) | a) |
| EG recycling | | yes | yes | yes | yes | yes | yes | yes | yes | yes | yes | yes |
| polycondensation time | (min) | | | 90 | 90 | 78 | 62 | 74 | 70 | 65 | 125 | 98 |
| after melt-phase polycondensation | | | | | | | | | | | | |
| IV | (dL/g) | 0.58 | 0.59 | 0.58 | 0.57 | 0.58 | 0.58 | 0.57 | 0.57 | 0.57 | 0.58 | 0.58 |
| COOH | (mVal/kg) | 36 | 42 | 38 | 41 | 51 | 46 | 49 | 47 | 37 | | |
| DEG | (mass %) | 1.3 | 1.8 | | | | | | | | | |
| residual AA in amorphous chips | (ppm) | 35 | 52 | 87 | 110 | 136 | 112 | 126 | 96 | 78 | | |
| L* | | 88.6 | 85.2 | 65.5 | 67.2 | 64.2 | 71.7 | 66.2 | 64.2 | 70.3 | 65.7 | 69.6 |
| b* | | −3.9 | −8.9 | −4.5 | −1.2 | −2.5 | −2.6 | −6.4 | −3.1 | −2.4 | −2.4 | −2.0 |
| after solid-phase polycondensation | | | | | | | | | | | | |
| IV | (dL/g) | 0.76 | 0.76 | 0.76 | 0.76 | 0.76 | 0.77 | 0.77 | 0.77 | 0.78 | 0.74 | 0.78 |
| COOH | (mVal/kg) | 25.0 | 30.3 | | | | | | | | | |
| residual AA | (ppm) | <1 | <1 | | | | | | | | | |
| AA regeneration (after 4 min. at 280° C.) | (ppm) | 6 | 11 | 11 | 13 | 18 | 16 | 11 | 11 | 10 | 9 | 7 |
| L* | | 86.0 | 89.7 | 85.5 | 86.2 | 84.4 | 86.5 | 83.3 | 85.4 | 87.2 | 85.5 | 87.9 |
| b* | | −1.8 | −3.5 | −1.7 | −0.1 | −0.8 | −0.5 | −3.8 | −1.3 | −1.0 | −1.2 | −0.8 |
| test plate/preform/bottle | | | | | | | | | | | | |
| AA in preform | (ppm) | 3.8 | 7.0 | | | | | | | | 5.1 | 3.3 |
| visual clarity (moulded plate) | | clear | hazy | clear | very hazy | very hazy | slight haze | hazy | hazy | clear | clear | very clear |
| haze (bottle wall) | (%/mm) | 19 | 60 | | | | | | | | 18 | 9 |

The results collected in Table 1 indicate that with this procedure of adding Sb- and P-compounds in the beginning, but the Zn-compound after esterification, especially in combination with increased concentration of phosphoric acid, PET can be produced with relatively short polycondensation times; and the PET obtained has good optical properties (both colour and clarity) even if recycled EG is used. In addition, the PET shows good thermal stability and low acetaldehyde generation. It can be seen that increasing phosphoric acid and adding the zinc after esterification solves both the AA regeneration and haze problems that occur with Sb—Zn catalysts when using recycled glycol.

Comparative Experiment 1 and Example 3

CE D and Ex 2 were repeated, but now on 50 kg scale in a different reactor system to enable making of performs and

The invention claimed is:
1. A process for making polyethylene terephthalate (PET) from ethylene glycol (EG), purified terephthalic acid (PTA) and optionally up to 30 mol % comonomer, using a catalyst system essentially consisting of antimony—(Sb), zinc—(Zn) and phosphorous—(P) compounds, comprising the steps of
   a) esterifying EG and PTA in the presence of the Sb-compound and the P-compound at a pressure of 0.1 to 10 MPa to form diethyleneglycol terephthalate and oligomers (DGT), and
   b) reducing the pressure to 50 to 500 Pa and melt-phase polycondensing DGT to form polyester and EG,
   wherein the Zn-compound is added after reducing the pressure; and
   wherein the catalyst system consists essentially of 50-200 ppm of Sb, and 20-200 ppm of Zn, and 40-100 ppm of P (elemental contents based on PET).

2. The process of claim 1,
wherein EG removed from polycondensation step b) is recycled back to esterification step a).

3. The process according to claim 1, wherein 0.5-6 mol % of a comonomer selected from the group consisting of isophthalic acid, diethylene glycol and 1,4-cyclohexanedimethanol is applied.

4. The process according to claim 1, further comprising the subsequent steps of
c) forming the polyester into pellets,
d) crystallising the pellets, and
e) solid-state polycondensing the polyester.

5. The process according to claim 1, wherein the EG is removed by distillation and recycled to a paste making step that forms part of step a).

6. The process according to claim 5, wherein the catalyst system consists essentially of 100-160 ppm of Sb, 100-150 ppm of Zn, and 40-70 ppm of P (elemental contents based on PET).

7. The process according to claim 6, wherein the catalyst system consists essentially of 125-150 ppm Sb (as Sb-triacetate), 120-140 ppm of Zn (as Zn-diacetate), and 40-60 ppm of P (as phosphoric acid).

8. A process for making polyethylene terephthalate (PET) from ethylene glycol (EG), purified terephthalic acid (PTA) and optionally up to 30 mol % comonomer, using a catalyst system essentially consisting of antimony—(Sb), zinc—(Zn) and phosphorous—(P) compounds, comprising the steps of,
a) esterifying EG and PTA in the presence of the Sb-compound and the P-compound to form diethyleneglycol terephthalate and oligomers (DGT), and
b) melt-phase polycondensing DGT to form polyester and EG,
wherein the Zn-compound is added after completion of the esterifying and during transferring the DGT to a subsequent reaction vessel for performing polycondensation step b);
wherein the catalyst system consists essentially of 50-200 ppm of Sb, and 20-200 ppm of Zn, and 40-100 ppm of P (elemental contents based on PET).

9. The process according to claim 1,
wherein the catalyst system consists essentially of 100-160 ppm of Sb, 100-150 ppm of Zn, and 40-70 ppm of P (elemental contents based on PET).

10. The process according to claim 1,
wherein the catalyst system consists essentially of 125-150 ppm Sb (as Sb-triacetate), 120-140 ppm of Zn (as Zn-diacetate), and 40-60 ppm of P (as phosphoric acid).

11. The process according to claim 1, wherein the P-compound is added in an amount resulting in 40-60 ppm based on PET mass.

12. A process for making polyethylene terephthalate (PET) from ethylene glycol (EG), purified terephthalic acid (PTA) and optionally up to 30 mol % comonomer, using a catalyst system essentially consisting of antimony—(Sb), zinc—(Zn) and phosphorous—(P) compounds, comprising the steps of
a) esterifying EG and PTA in the presence of the Sb-compound and the P-compound at a temperature of 230 to 270° C. to form diethyleneglycol terephthalate and oligomers (DGT), and
b) increasing the temperature to 275 to 290° C. and melt-phase polycondensing DGT to form polyester and EG,
wherein the Zn-compound is added after completion of step a) and after increasing the temperature; and
wherein the catalyst system consists essentially of 50-200 ppm of Sb, and 20-200 ppm of Zn, and 40-100 ppm of P (elemental contents based on PET).

13. The process of claim 12, wherein EG removed from polycondensation step b) is recycled back to esterification step a).

14. The process according to claim 12, wherein 0.5-6 mol % of a comonomer selected from the group consisting of isophthalic acid, diethylene glycol and 1,4-cyclohexanedimethanol is applied.

15. The process according to claim 12, further comprising the subsequent steps of
c) forming the polyester into pellets,
d) crystallising the pellets, and
e) solid-state polycondensing the polyester.

16. The process according to claim 12, wherein the EG is removed by distillation and recycled to a paste making step that forms part of step a).

17. The process according to claim 12, wherein the catalyst system consists essentially of 125-150 ppm Sb (as Sb-triacetate), 120-140 ppm of Zn (as Zn-diacetate), and 40-60 ppm of P (as phosphoric acid).

18. The process according to claim 12, wherein the P-compound is added in an amount resulting in 40-60 ppm based on PET mass.

* * * * *